(12) United States Patent
Song et al.

(10) Patent No.: US 12,576,689 B2
(45) Date of Patent: Mar. 17, 2026

(54) FLUID CONTROL ASSEMBLY AND VALVE DEVICE

(71) Applicant: ZHEJIANG SANHUA AUTOMOTIVE COMPONENTS CO., LTD., Hangzhou (CN)

(72) Inventors: Bin Song, Hangzhou (CN); Yuan Yao, Hangzhou (CN); Keli Ye, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 0 days.

(21) Appl. No.: 18/710,216

(22) PCT Filed: Nov. 17, 2022

(86) PCT No.: PCT/CN2022/132472
§ 371 (c)(1),
(2) Date: May 15, 2024

(87) PCT Pub. No.: WO2023/088340
PCT Pub. Date: May 25, 2023

(65) Prior Publication Data
US 2024/0424859 A1 Dec. 26, 2024

(30) Foreign Application Priority Data

Nov. 17, 2021 (CN) .......................... 202111361551.7

(51) Int. Cl.
*B60H 1/00* (2006.01)
(52) U.S. Cl.
CPC ..... *B60H 1/00485* (2013.01); *B60H 1/00571* (2013.01); *B60H 1/00885* (2013.01)

(58) Field of Classification Search
CPC ............ B60H 1/00485; B60H 1/00571; B60H 2001/00171; B60H 1/00885
See application file for complete search history.

(56) References Cited

U.S. PATENT DOCUMENTS 6,715,510 B2 4/2004 Herbert
6,904,895 B1 6/2005 Moreno
(Continued)

FOREIGN PATENT DOCUMENTS

CN 205940233 U * 2/2017
CN 108068572 A 5/2018
(Continued)

OTHER PUBLICATIONS

International Search Report for PCT/CN2022/132472 mailed Jan. 19, 2023 ISA/CN.
(Continued)

*Primary Examiner* — Syed O Hasan
(74) *Attorney, Agent, or Firm* — Yue (Robert) Xu; Apex Attorneys at Law, LLP

(57) ABSTRACT

A fluid control assembly and a valve device are provided. The fluid control assembly comprising a connector, wherein the connector has a connection port, and the connection port comprises a first connection port and a second connection port, the first connection port and the second connection port being located on the same wall of the connector, which facilitates fixed connection between the connector and a plate. The plate and the connector are separately arranged and are fixedly connected to each other, and such an arrangement is beneficial to save on the processing time cost and material cost, compared with the integral arrangement of a connector and a plate.

8 Claims, 22 Drawing Sheets

(56)                    References Cited

U.S. PATENT DOCUMENTS

| | | | |
|---|---|---|---|
| 9,903,674 B2 * | 2/2018 | Kim ...................... | F16K 31/002 |
| 2005/0284529 A1 | 12/2005 | Iwabuchi | |
| 2006/0070674 A1 | 4/2006 | Eidsmore | |
| 2007/0090200 A1 | 4/2007 | Lamb et al. | |
| 2018/0180070 A1 | 6/2018 | Uesugi et al. | |
| 2020/0119414 A1 | 4/2020 | Zhang et al. | |
| 2021/0332904 A1 * | 10/2021 | Huang ................ | F16K 27/0254 |

FOREIGN PATENT DOCUMENTS

| | | | | |
|---|---|---|---|---|
| CN | 108266568 A | | 7/2018 | |
| CN | 109520176 A | | 3/2019 | |
| CN | 110459830 A | | 11/2019 | |
| CN | 110459833 A | | 11/2019 | |
| CN | 118258249 A | * | 6/2024 | ............. F25B 43/00 |
| JP | 2004069152 A | | 3/2004 | |
| JP | 2006220237 A | | 8/2006 | |

OTHER PUBLICATIONS

The European search report issued on Oct. 15, 2025 for EP22894872.
5.

* cited by examiner

14

141

FLUID CONTROL ASSEMBLY AND VALVE DEVICE

This disclosure is a national phase application of PCT international patent application PCT/CN2022/132472, filed on Nov. 17, 2022 which claims the benefit of the priority to Chinese Patent Disclosure No. 202111361551.7, titled "FLUID CONTROL ASSEMBLY AND VALVE DEVICE", filed with the China National Intellectual Property Administration on Nov. 17, 2021, which are incorporated herein by reference in its entirety.

FIELD

The present disclosure relates to the technical field of fluid control, and in particular to a fluid control assembly and a valve device.

BACKGROUND

A fluid control assembly includes a flow passage plate and a valve element, and the flow passage plate is provided with flow passages and ports for mounting the valve element. In that case, the manufacturing is relatively complicated, and the overall volume and weight of the flow passage plate are large, which is not beneficial to time-saving and material-cost reduction.

SUMMARY

An object according to the present disclosure is to provide a fluid control assembly and a valve device, which is beneficial to reducing time cost and material cost for manufacturing.

To achieve the above object, the following technical solution is provided according to the present disclosure.

A fluid control assembly includes a plate and at least one connector. The plate and the at least one connector are separately arranged and fixedly connected, the plate has passages and orifices, the orifices at least include a first orifice and a second orifice, the passages at least include a first passage and a second passage, the first orifice is in communication with the first passage, the second orifice is in communication with the second passage, and the first orifice and the second orifice are located on a same wall of the plate. The connector has connection ports which include a first connection port and a second connection port, the first connection port and the second connection port are located on a same wall of the connector, and each connection port is opposite to at least a part of the corresponding orifice. The connector further has a mounting port, and the mounting port is configured to mount a valve component.

A valve device includes a valve component and a connector. The valve component is fixedly connected with the connector, the valve component has a mounting port, at least a part of the valve component is located in the mounting port, the connector includes a first connection port, a second connection port, a first flow passage and a second flow passage, the first connection port is in communication with the first flow passage, the second connection port is in communication with the second flow passage, the first connection port and the second connection port are located on a same wall of the connector, the valve device has a valve port, and the first flow passage is in communication with the second flow passage through the valve port.

The fluid control assembly and the valve device according to the embodiments of the present disclosure include the connector, the connector has the connection ports which include the first connection port and the second connection port, and the first connection port and the second connection port are located on the same side of the connector, which facilitates the fixed connection between the connector and the plate. Compared with the integral arrangement of the connector and the plate, the plate and the connector are separately arranged and fixedly connected, which is beneficial to reducing the time cost and material cost for manufacturing.

DETAILED DESCRIPTION OF THE EMBODIMENTS

The present disclosure is further illustrated hereinafter in conjunction with drawings and specific embodiments.

Figure 1:
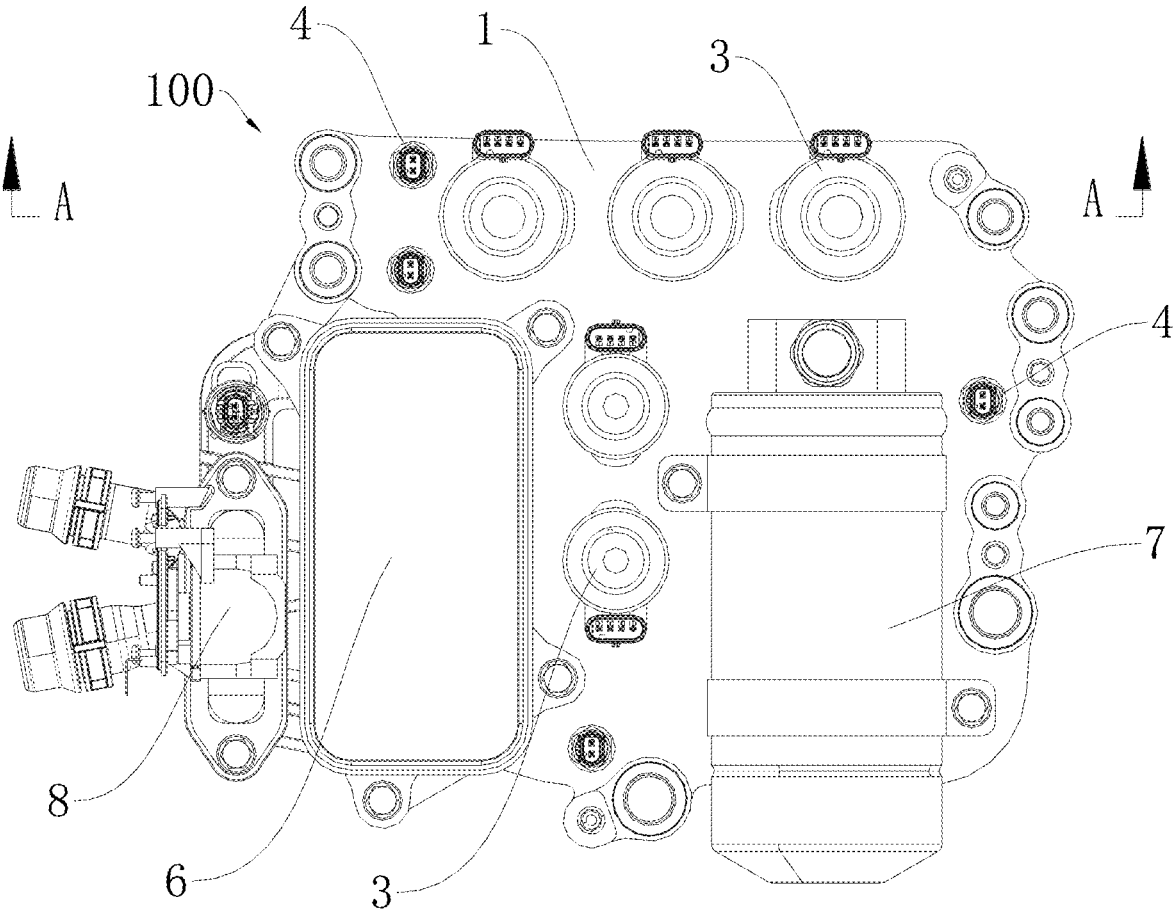
FIG. 1 is a schematic front view of a fluid control assembly in a first embodiment.
Figure 2:
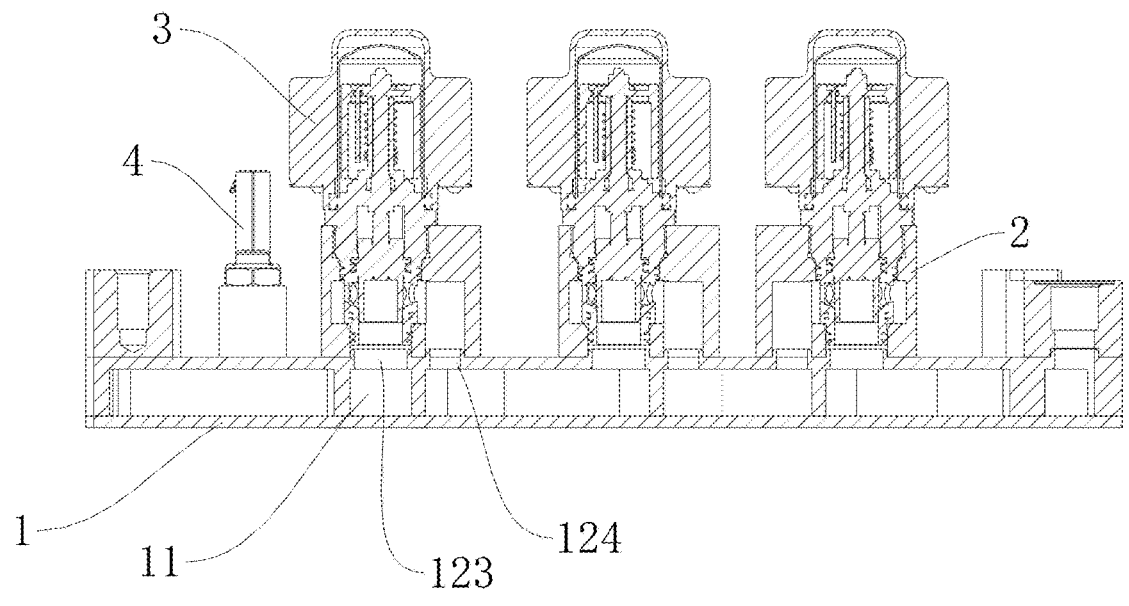
FIG. 2 is a schematic cross-sectional view of the fluid control assembly in FIG. 1 taken along line A-A.
Figure 3:
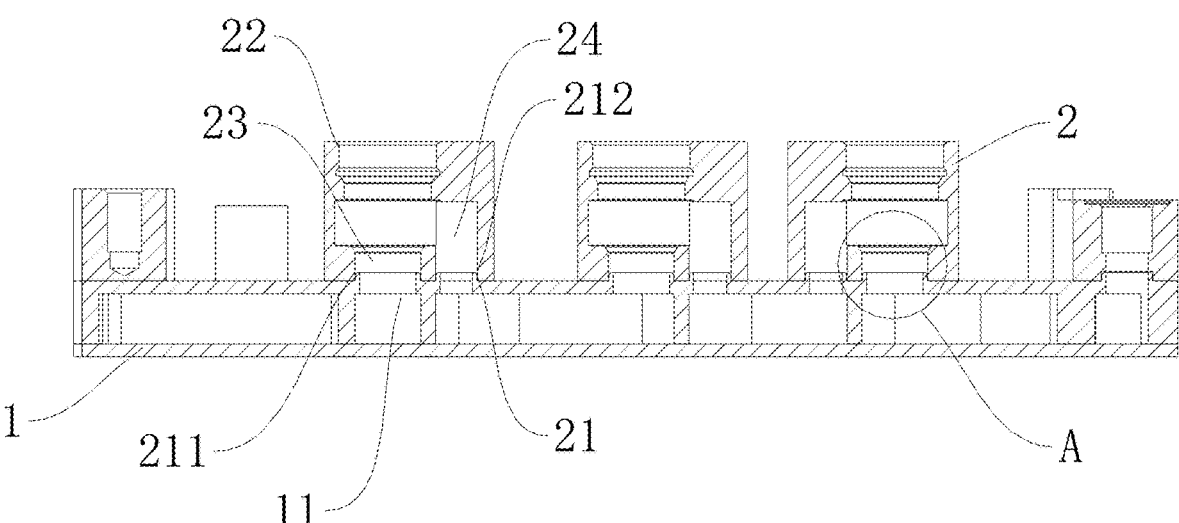
FIG. 3 is a schematic cross-sectional view of the fluid control assembly with removing valve components in FIG. 2.
Figure 4:
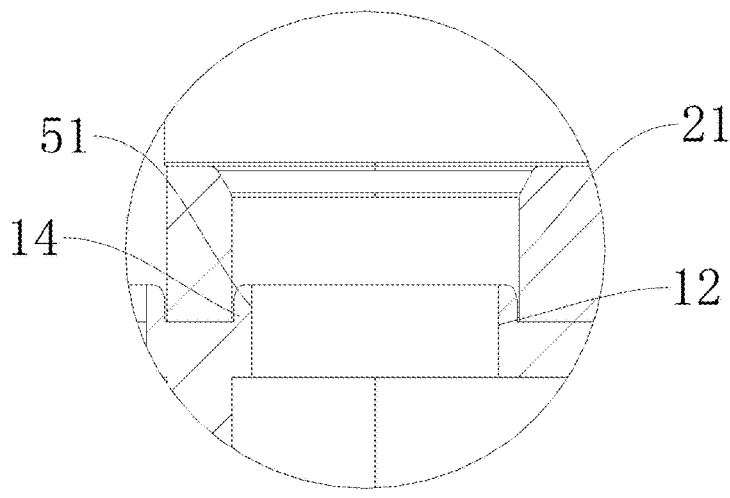
FIG. 4 is a schematic enlarged view of portion A in FIG. 3.
Figure 5:
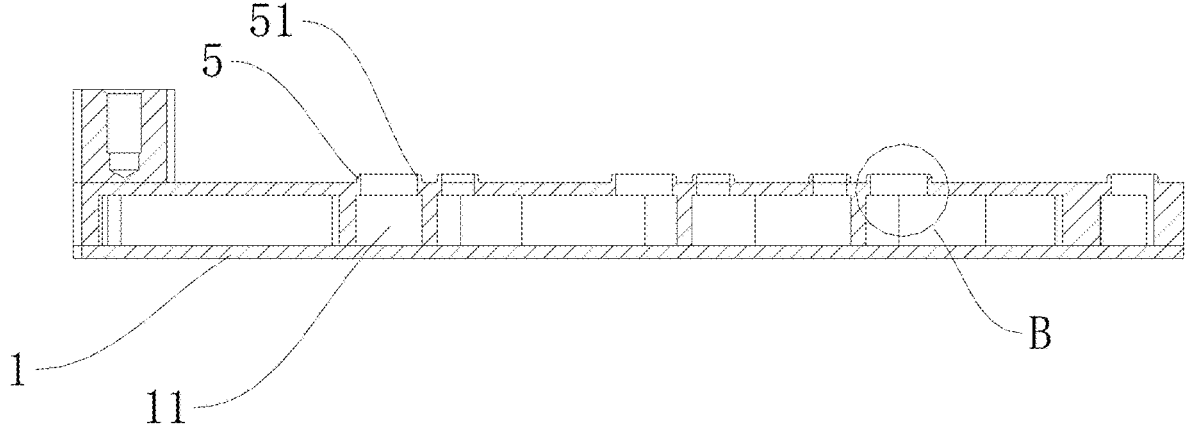
FIG. 5 is a schematic cross-sectional view of the fluid control assembly with removing connectors in FIG. 3.
Figure 6:
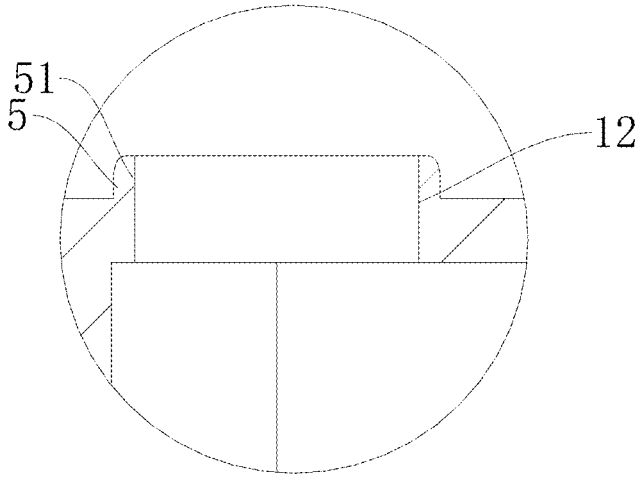
FIG. 6 is a schematic enlarged view of portion B in FIG. 5.
Figure 7:
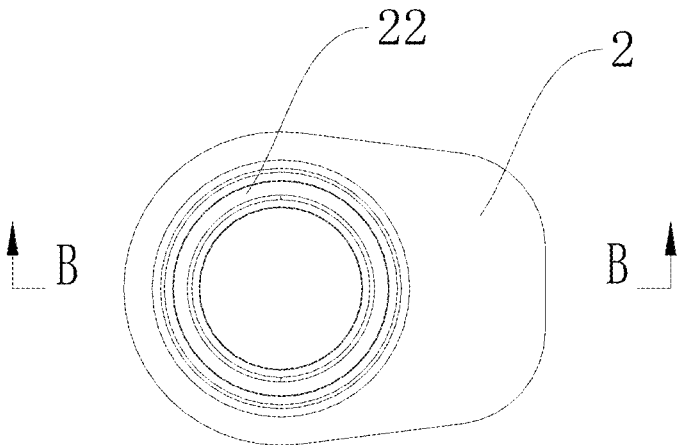
FIG. 7 is a schematic structural view of the connector viewed from one perspective.
Figure 8:
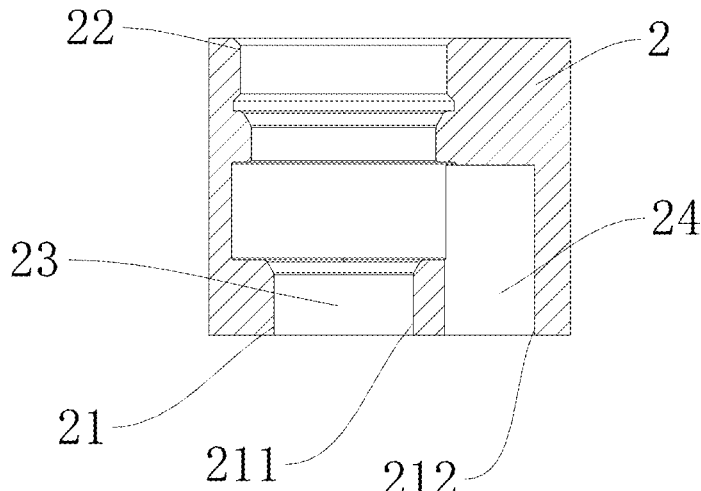
FIG. 8 is a schematic cross-sectional view of the connector in FIG. 7 taken along line B-B.

Referring to FIG. 1 to FIG. 3, a fluid control assembly 100 may be used to a heat management system, and the heat management system may be a vehicle heat management system, specifically as a new energy vehicle heat management system. The fluid control assembly 100 includes a plate 1. Multiple passages 11 are formed in the plate 1. Various elements required for the fluid control assembly 100 are mounted on the plate 1. For example, in this embodiment, the fluid control assembly 100 includes a valve component 3, a detection element 4, a heat exchange element 6, a liquid reservoir element 7 and a passage switching element 8. Other elements or equipment of the heat management system are connected with the fluid control assembly 100 through connecting pipes. Other elements of the heat management system include an evaporator, a condenser and the like, and the various elements located on the plate 1 are in communication through the passages 11 in the plate 1, which avoids the use of a large number of connecting pipes to connect the various elements and reduces the occupied space of the fluid control assembly 100.

Referring to FIG. 1 to FIG. 6, FIG. 11 and FIG. 12, in this embodiment, the fluid control assembly 100 further includes multiple connectors 2. The plate 1 and the connectors 2 are separately arranged. The plate 1 and the connectors 2 are fixedly connected. The plate 1 further has an orifice 12, which at least include a first orifice 121 and a second orifice 122. The passages 11 at least include a first passage 123 and a second passage 124. The first orifice 121 is in communication with the first passage 123, the second orifice 122 is in communication with the second passage 124, and the first orifice 121 and the second orifice 122 are located on a same wall of the plate 1. The connector 2 has connection ports 21, which include a first connection port 211 and a second connection port 212. The first connection port 211 and the second connection port 212 are located on a same wall of the connector 2. Each connection port 21 is arranged corresponding to at least a part of the corresponding orifice 12 on the plate 1, or each connection port 21 is in communication with the corresponding orifice 12 on the plate 1. The connector 2 further has a mounting port 22, and the mounting port 22 is configured to mount a valve component 3. In this way, it does not need to machine the passages 11 and the mounting port 22 on a whole metal valve block, which avoids complicated machining. The plate 1 and the connectors 2 are separately arranged and then fixedly connected, so that the overall volume and weight of the plate 1 may be reduced, thereby reducing the overall volume and weight of the fluid control assembly, which is beneficial to reduce time cost and material cost.

Referring to FIG. 5 and FIG. 12 to FIG. 15, in this embodiment, in order to realize the lightweight of the plate 1, the plate 1 includes a first plate portion 13 and a first composite plate 14. In this embodiment, the first plate portion 13 has slot cavities 131 forming part of the passages 11 and holes 132, and the slot cavities 131 are in communication with the holes 132. Each orifice 12 is located on an outer side of the hole 132, and the number of the slot cavities 131 and the number of the holes 132 may be plural. The holes 132 extend through the first plate portion 13, and the slot cavities 131 forming part of the passages 11 do not extend through the first plate portion 13. Specifically, the slot cavities 131 and the holes 132 may be integrally formed by cold extrusion process. The first plate portion 13 is in abutment with and connected with the first composite plate 14. In this embodiment, the first plate portion 13 is sealingly fixed to the first composite plate 14 by welding. The first plate portion 13 is matched with the first composite plate 14 to form the passages of the plate 1, which facilitates the lightweight of the plate 1 compared with forming the passages 11 by machining the whole valve block. Specifically, the first plate portion 13 includes a first wall 13. In a direction perpendicular to the first wall 133, the slot cavities 131, which are recessed from the first wall 133 away from the first wall 133, and the holes 132 are formed in the first plate portion 13. Correspondingly, the first composite plate 14 includes a second wall 141, which is flat. When the first plate portion 13 is matched with the first composite plate 14, the first wall 133 is in abutment with and sealingly fixed to the second wall 141 by welding, so as to form the passages 11 of the plate 11. In this embodiment, by providing a solder composite layer on the first wall 133 or the second wall 141, or providing a copying welding sheet between the first wall 133 and the second wall 141, the welding of the first plate portion 13 and the first composite plate 14 is implemented. A welding layer is formed by welding, and the first plate portion 13 and the first composite plate 14 are sealed by the welding layer. The welding method may be vacuum furnace welding, tunnel furnace welding and the like. Of course, the holes 132 may be formed in the first composite plate 14, that is, the holes 132 extend through the first composite plate 14 along a direction perpendicular to the second wall 141. In this case, the first plate portion 13 only has slot cavities 131 forming the passages 11. The first wall 133 is in abutment with and is sealingly fixed to the second wall 141 by welding, and the first plate portion 13 is matched with the first composite plate 14 to form the passages of the plate 1. Of course, in other embodiments, the slot cavities may be formed in both the first plate portion 13 and the first composite plate 14. The slot cavities on the first plate portion 13 are arranged to correspond to the slot cavities on the first composite plate 14, and the first plate portion 13 is abutting jointed with and sealingly fixed to the first composite plate 14 by welding, so as to form the passages 11. Alternatively, slot cavities are formed on both sides of the first plate portion 13. The plate 1 includes a first composite plate and a second composite plate, the first plate portion 13 is located between the first composite plate and the second composite plate, the first plate portion 13 is abutting jointed with and sealingly fixed to the first composite plate by welding so as to form a group of passages 11, and the first plate portion 13 is abutting jointed with and sealingly fixed to the second composite plate by welding so as to form another group of passages 11. Alternatively, in other embodiments, a part of the connector may be integrally formed with the first plate portion by cold extrusion process.

Referring to FIG. 2 to FIG. 6 and FIG. 12, the fluid control assembly 100 includes a positioning portion 5. In this embodiment, the positioning portion 5 includes a protrusion 51 which is a part of the plate 1 and is annular. At least one orifice 12 is formed in the protrusion 51, and at least a part of the protrusion 51 is located inside the connection port 21. When the connector 2 is fixedly connected with the plate 1, the protrusion 51 is located in the connection port 21, so that the connection port 21 of the connector 2 and the orifice 12 in the plate 1 can be accurately positioned. In this embodiment, an outer side of the top of the protrusion 51 is chamfered, which can provide guidance for the connection port 21 and the protrusion 51 to facilitate assembly.

Referring to FIG. 2 to FIG. 6, in another embodiment, the positioning portion 5 includes a protrusion and a groove (not shown). The protrusion is a part of the plate 1, the groove is formed on the connector 2, an opening of the groove is arranged toward a side of the plate, and the groove is arranged around the connection port 21. When the connector 2 is fixedly connected with the plate 1, at least a part of the protrusion is located inside the groove, so that the connection port 21 of the connector 2 and the orifice 12 on the plate 1 can also be accurately positioned with this arrangement. In another embodiment, the protrusion may be provided on the connector 2, and the groove is formed in the plate 1, so that the connection port 21 of the connector 2 and the orifice 12 on the plate 1 can also be accurately positioned.

Referring to FIG. 2 to FIG. 6 and FIG. 12, in another embodiment of the connector 2, the connector 2 has at least two connection ports 21, which are matched at least two orifices 12 on the plate 1. The fluid control assembly 100 has at least two positioning portions 5. The arrangement of providing at least two positioning portions 5 can prevent the connector 2 from rotating relative to the plate 1, and facilitate the positioning of the connector 2 relative to the plate 1. In another embodiment of the connector 2, the connector 2 has at least two connection ports 21, the fluid control assembly 100 has one positioning portion 5, and the plate 1 further has a protruding portion (not shown). The position of the protruding portion is different with that of the protrusion 51, which is not arranged around the orifice 12. The connector 2 has a positioning groove (not shown) or a positioning hole (not shown), and the protruding portion is located in the positioning groove. Alternatively, the plate 1 has a positioning groove or a positioning hole, the connector 2 has a protruding portion, and the protruding portion is located in the positioning groove. With this arrangement, it can also prevent the connector 2 from rotating relative to the plate 1, and facilitate the positioning of the connector 2 relative to the plate 1. In this embodiment, in a case that the connector 2 has at least two connection ports 21, in order to prevent the connector 2 from being mounted in a wrong direction, the two protrusions 51 can be configured in different shapes, for example, one is configured in a substantially circular shape and the other is configured in a substantially oval shape. Meanwhile, the corresponding connection ports 21 are also configured in matching shapes, respectively.

In this embodiment, the connector 2 is fixed to the plate 1 by welding, a welding layer is provided between the connector 2 and the plate 1, and the connector 2 and the plate 1 are sealed by the welding layer. An outer surface of the connector 2 or an outer surface of the plate 1 has a solder composite layer, and the welding layer is formed by melting the solder composite layer at high temperature. The connector 2 and the plate 1 are fixed by welding and sealed by welding layer between the connector 2 and the plate 1. In this embodiment, the connector 2 is fixed to an upper surface of the plate 1, so that the upper surface of the plate 1 has the solder composite layer. Of course, a surface, which is to be fixed to the plate 1, of the connector 2 may be provided with the solder composite layer, or each of the outer surface of the connector 2 and the outer surface of the plate 1 are provided with the solder composite layer as required. In other embodiments, a welding sheet may be provided between the connector 2 and the plate 1. By melting the welding sheet at high temperature, the connector 2 and the plate 1 are fixed by welding and sealed by the welding layer between the connector 2 and the plate 1. The welding sheet may be a copying welding sheet, which copies a shape of a contact surface between the connector 2 and the plate 1, and thus can save solder. In this embodiment, the welding method can be vacuum furnace welding, tunnel furnace welding, and the like.

Referring to FIG. 1 to FIG. 3, and FIG. 7 to FIG. 10, in an embodiment of the connector 2, the connector 2a is fixedly connected with the valve component 3, the mounting port 22 is configured to mount the valve component 3, and at least a part of the valve component 3 is located in the mounting port 22. The connector 2a includes a first flow passage 23 and a second flow passage 24. The connection ports 21 include a first connection port 211 and a second connection port 212, which are located on a same wall of the connector 2. The first connection port 211 is in communication with the first flow passage 23, and the second connection port 212 is in communication with the second flow passage 24. The plate 1 includes a first orifice 121, a second orifice 122, a first passage 123 and a second passage 124, and the first orifice 121 and the second orifice 122 are located on a same wall of the plate 1. The first orifice 121 is in communication with the first passage 123, the second orifice 122 is in communication with the second passage 124, the first connection port 211 is in communication with the first orifice 121, and the second connection port 212 is in communication with the second orifice 122. The connector 2a can adjust a flow rate of a working medium between the first flow passage 23 and the second flow passage 24, or the valve component 3 can block or directly communicate the working medium between the first flow passage 23 and the second flow passage 24. For example, the valve component 3 may be a throttle valve component or a solenoid valve component, which can be selected according to the requirements of the system. The valve component 3 can be fixedly connected with the connector 2 by screws or snap-fitting. In some cases, different valve components 3 can be fitted with the connector 2 with the same type of mounting port 22, which facilitates the mass production of the connector 2.

Referring to FIG. 16 to FIG. 19, in a second embodiment of the fluid control assembly, and in another embodiment of the connector 2, the fluid control assembly 100 further includes an intermediate connector 2b which is fixedly connected with the plate 1 and the connector 2. The intermediate connector 2b has first side connection ports 21b, second side connection ports 22b and an intermediate flow passage 23b, where the first side connection port 21b are in communication with the second side connection port 22b through the intermediate flow passage 23b. The first side connection ports 21b are in communication with the orifices 12 of the plate 1, the second side connection ports 22b are in communication with the connection ports 21 of the connector 2. A positioning portion 5 is provided on a side of the second side connection port 22b to improve the reliability of the connection between the intermediate connector 2b and the connector 2. The intermediate connector 2b includes at least four first side connection ports 21b and at least four second side connection ports 22b, and the intermediate connector 2b can be connected with at least two connectors 2. In an example of this embodiment, the intermediate connector 2b has six second side connection ports 22b, the intermediate connector 2b is fixedly connected with three valve components 3, and the three valve components 3 are arranged side by side (or not side by side). A position or an orientation of the valve component 3 can be adjusted flexibly by providing the intermediate connector 2b, so as to be applicable to different fluid control assemblies 100. In other embodiments, the intermediate connector is not limited to the mounting connector.

Referring to FIG. 20 to FIG. 23, in a third embodiment of the fluid control assembly, the connector 2c includes at least two mounting ports 22, the connector 2c is fixedly connected with the plate 1 and the valve component 3, at least two valve components 3 are mounted on the connector 2. The valve components 3 are arranged side by side, and the mounting ports 22 can be located on a side, opposite to the plate 1, of the connector 2, or located on a side, perpendicular to the plate 1, of the connector 2. In an example of this embodiment, the connector 2c has three mounting ports 22, the connector 2c is fixedly connected with three valve components 3, and the three valve components 3 are arranged side by side (or not side by side). The assembly process can be simplified and the number of components can be reduced when requiring more valve components 3 for the system. In other embodiments, the connector 2c is not limited to mounting the valve components 3.

Figure 24:
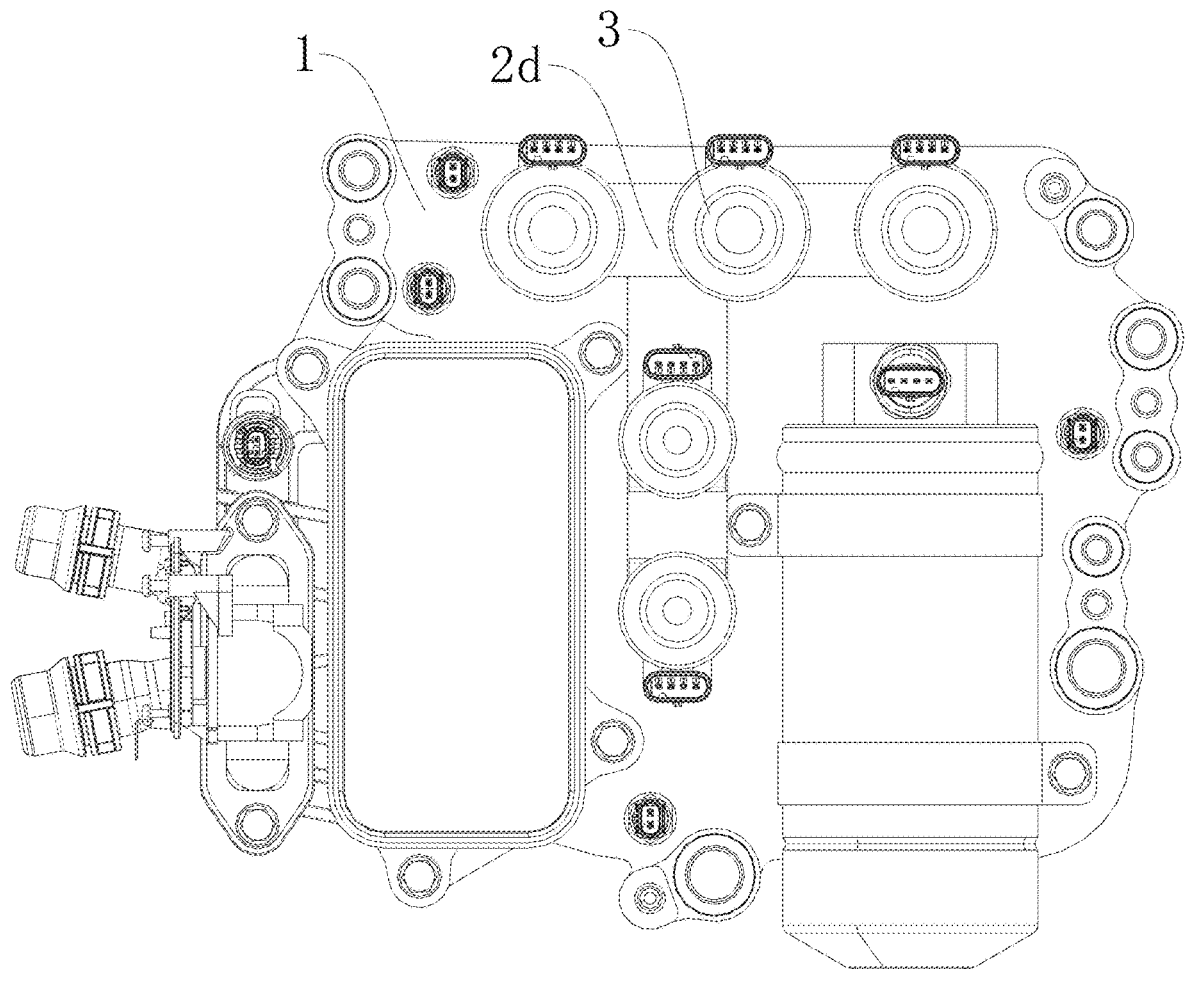
FIG. 24 is a schematic front view of the fluid control assembly in a fourth embodiment.
Figure 25:
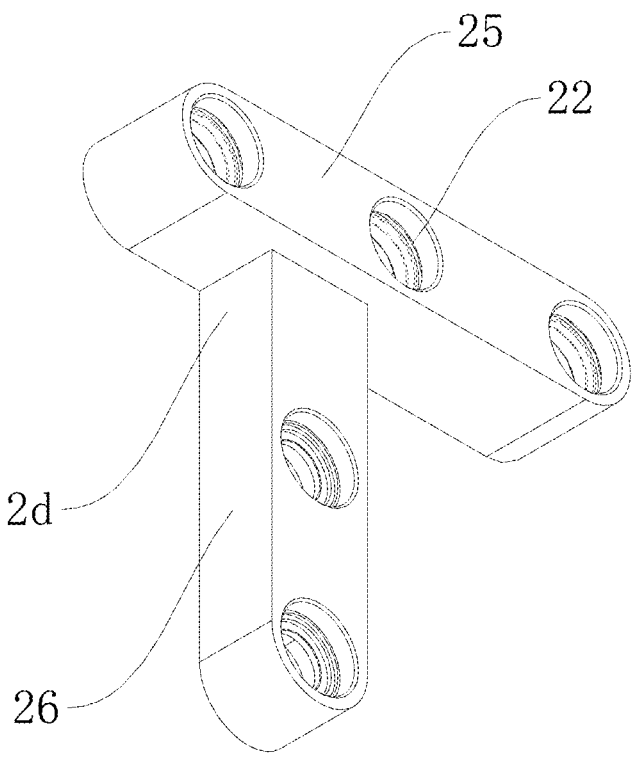
FIG. 25 is a schematic structural view of the connector in FIG. 24 viewed from one perspective.
Figure 26:
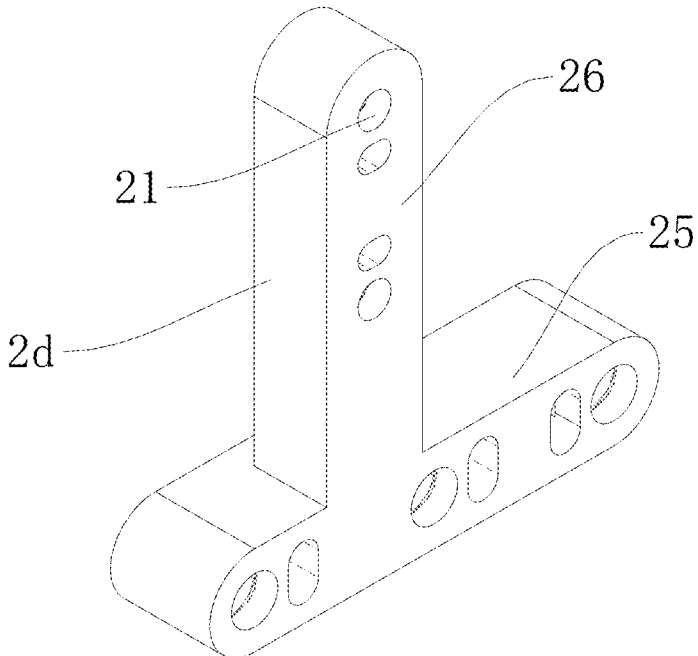
FIG. 26 is a schematic structural view of the connector in FIG. 24 viewed from another perspective.

Referring to FIG. 24 to FIG. 26, in a fourth embodiment of the fluid control assembly, the connector 2d is T-shaped, the connector 2 has at least three mounting ports 22, at least three valve components 3 can be mounted on the connector 2d, the connector 2d includes a first portion 25 and a second portion 26, and the valve component 3 is mounted on each of the first portion 25 and the second portion 26. The first portion 25 is substantially perpendicular to the second portion 26. In an example of this embodiment, the connector 2d has five mounting ports 22, five valve components 3 are mounted on the connector 2d, in which three valve components 3 are mounted on the first portion 25, and two valve components 3 are mounted on the second portion 26. The assembly process can be simplified and the number of components can be reduced even when the system requires more valve components 3. In other embodiments, the connector 2 may be in other shapes. In other embodiments, the connector 2d is not limited to mounting the valve component 3.

Figure 9:
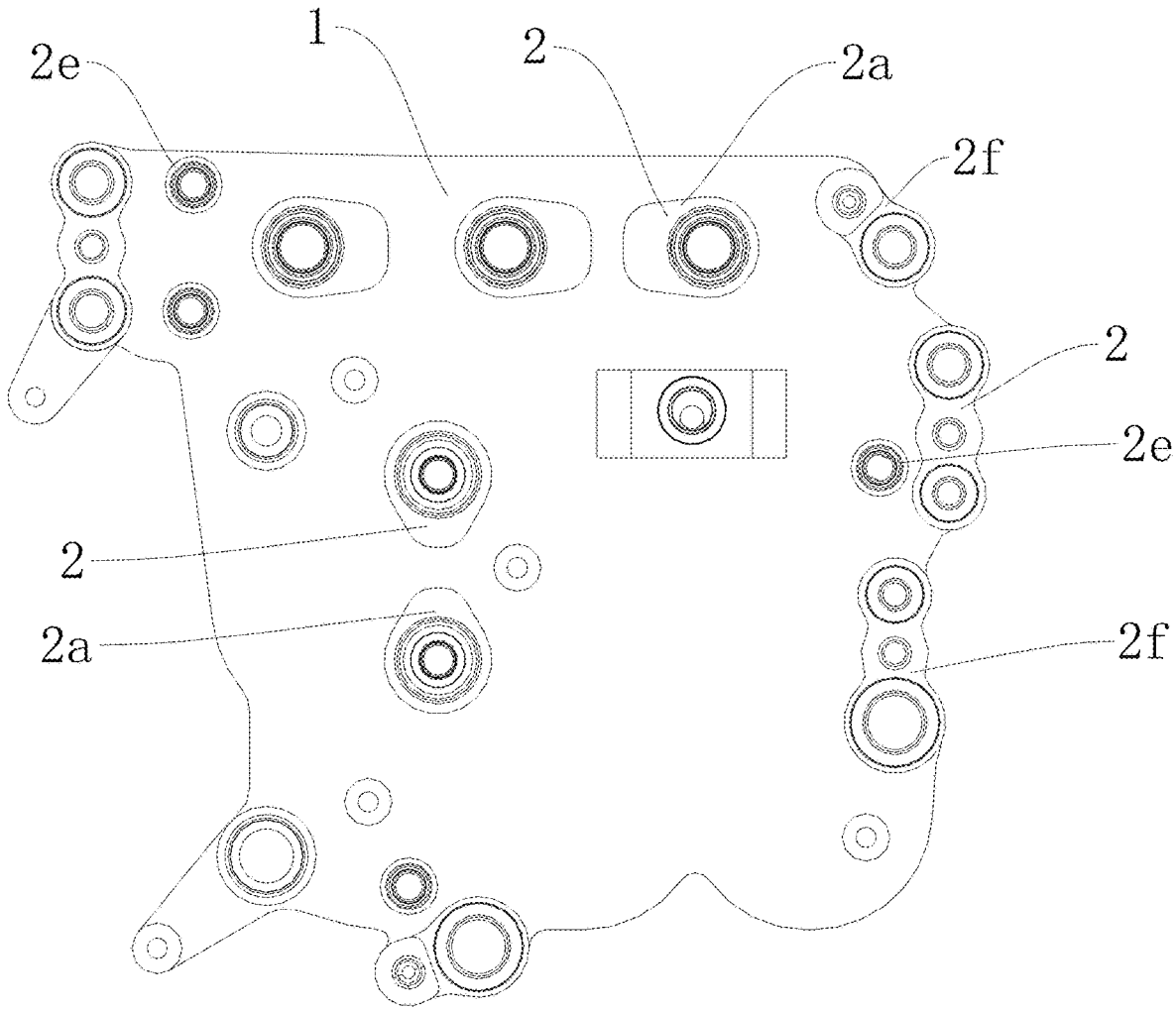
FIG. 9 is a schematic structural view of a combination of a plate and the connectors in FIG. 1 viewed from one perspective.
Figure 10:
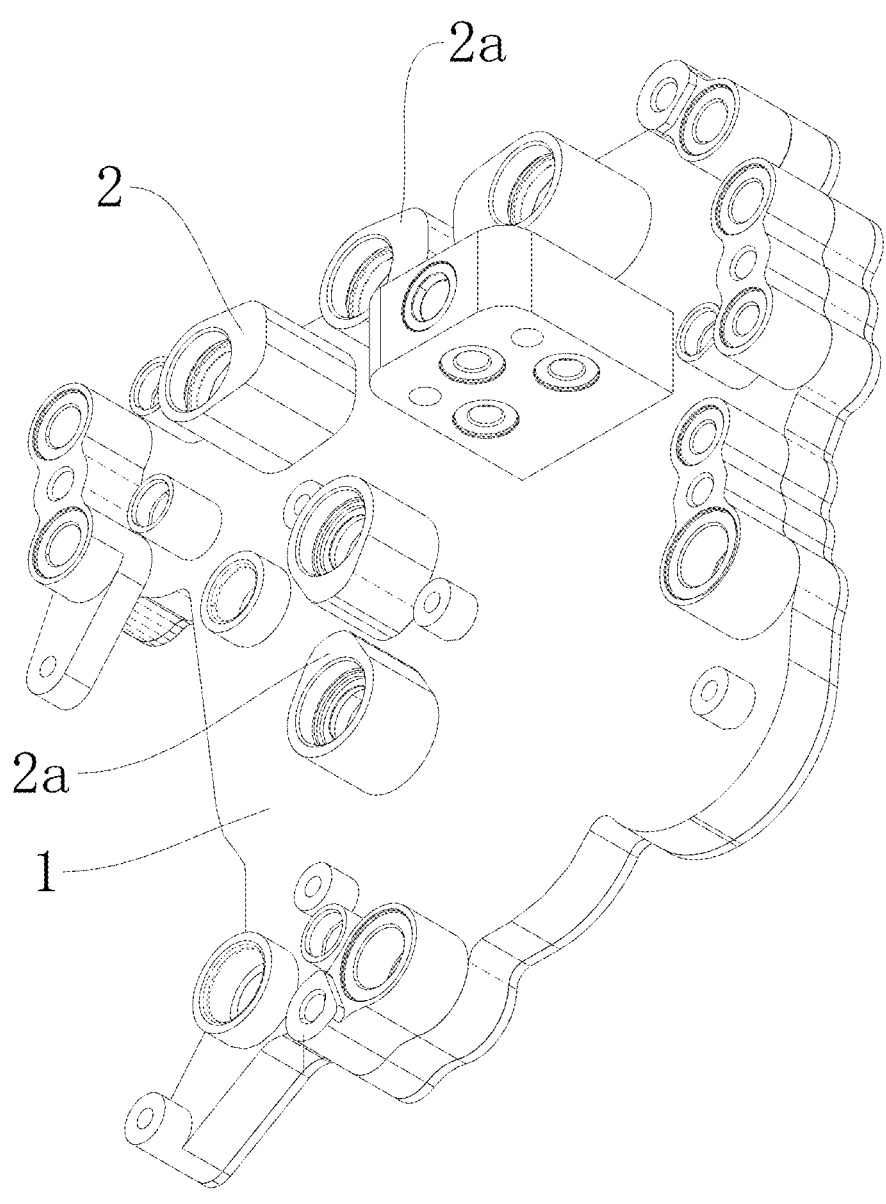
FIG. 10 is a schematic cross-sectional view of the combination of the plate and the connectors viewed from another perspective.
Figure 11:
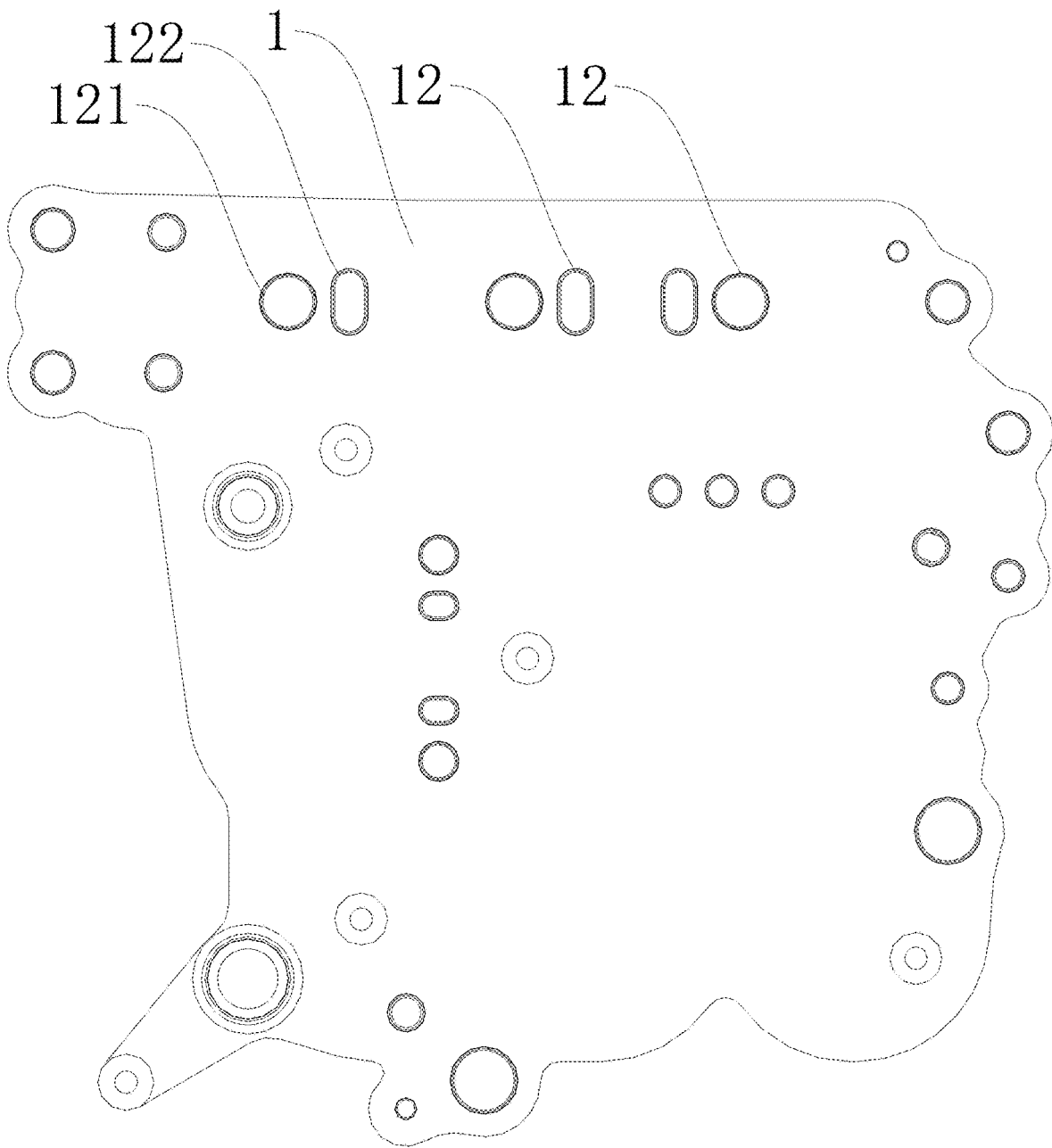
FIG. 11 is a schematic structural view of the plate viewed from one perspective.
Figure 12:
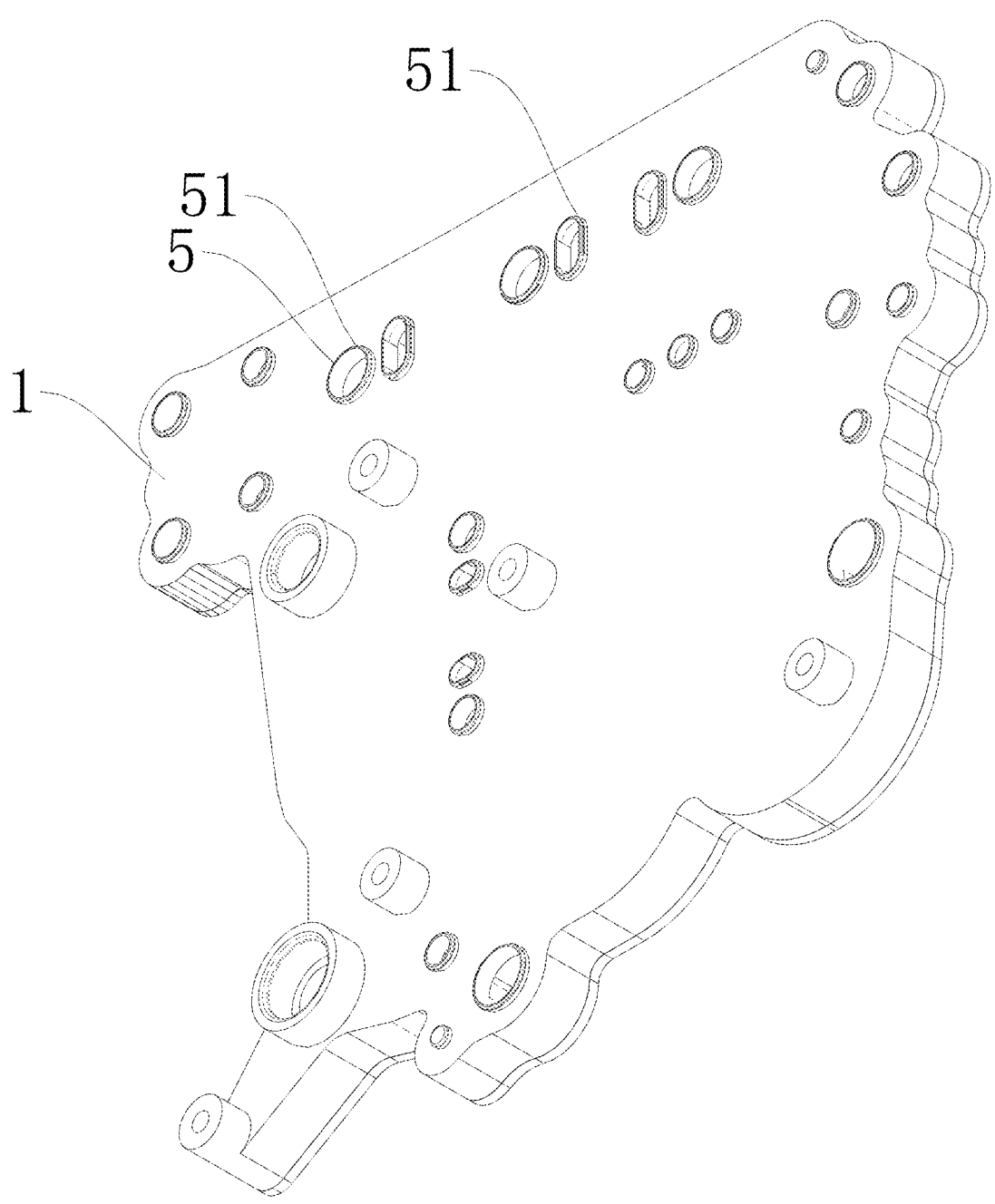
FIG. 12 is a schematic structural view of the plate viewed from another perspective.
Figure 13:
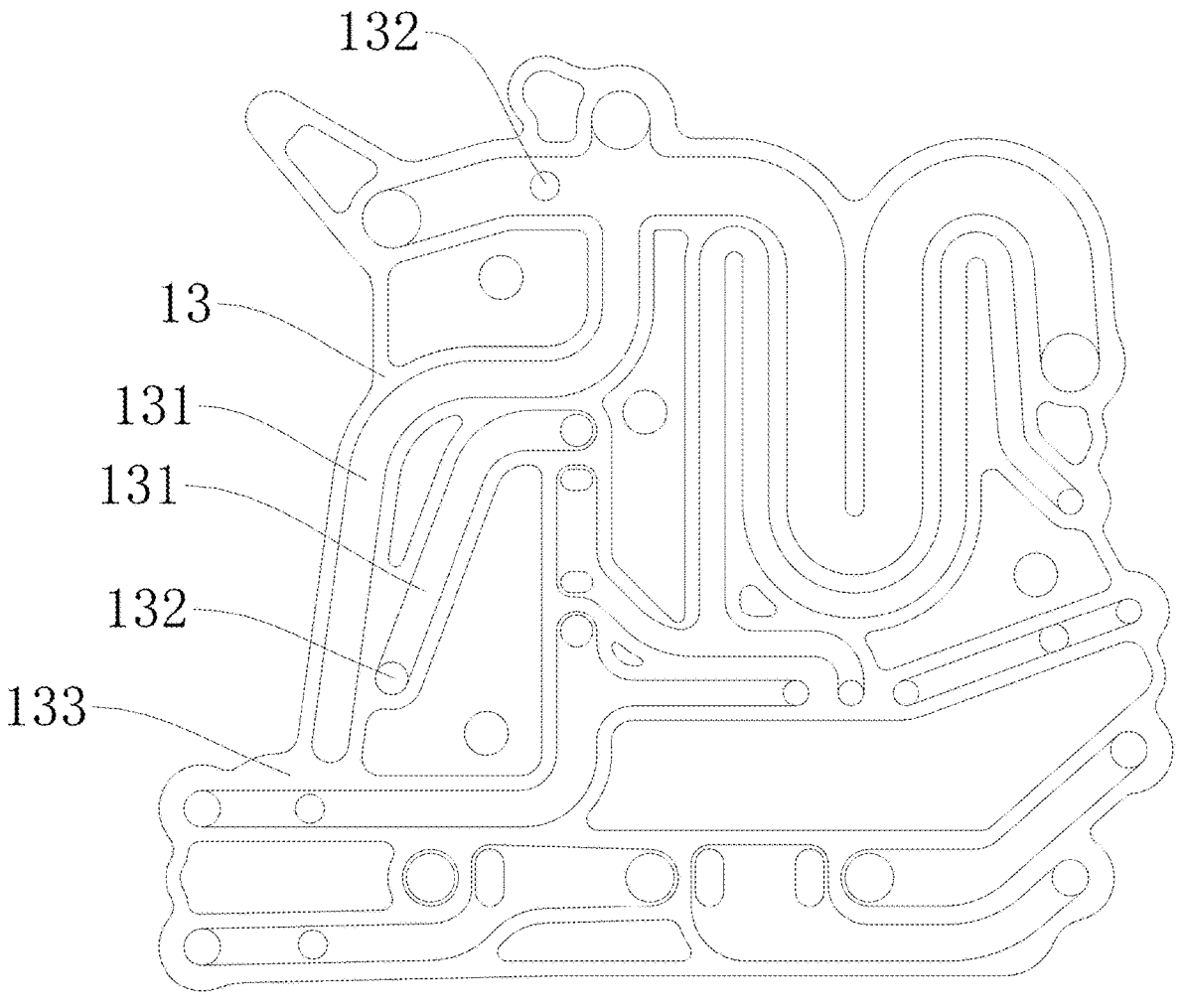
FIG. 13 is a schematic structural view of a first plate portion in FIG. 11 viewed from one perspective.
Figure 14:
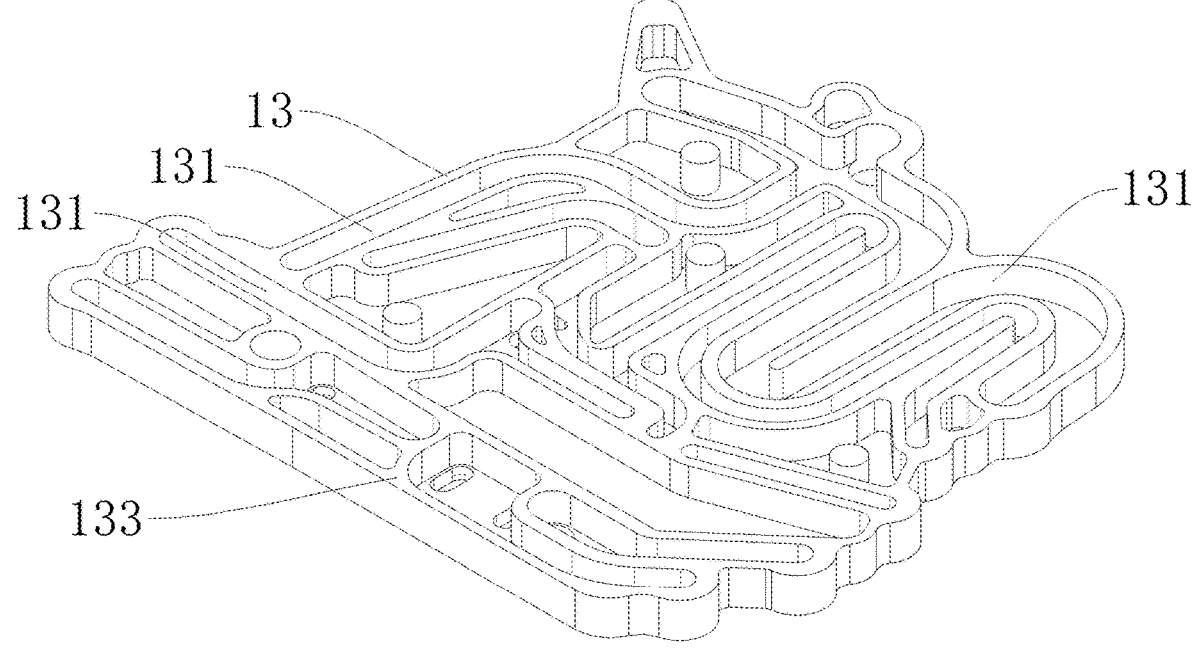
FIG. 14 is a schematic structural view of the first plate portion in FIG. 13 viewed from another perspective.
Figure 15:
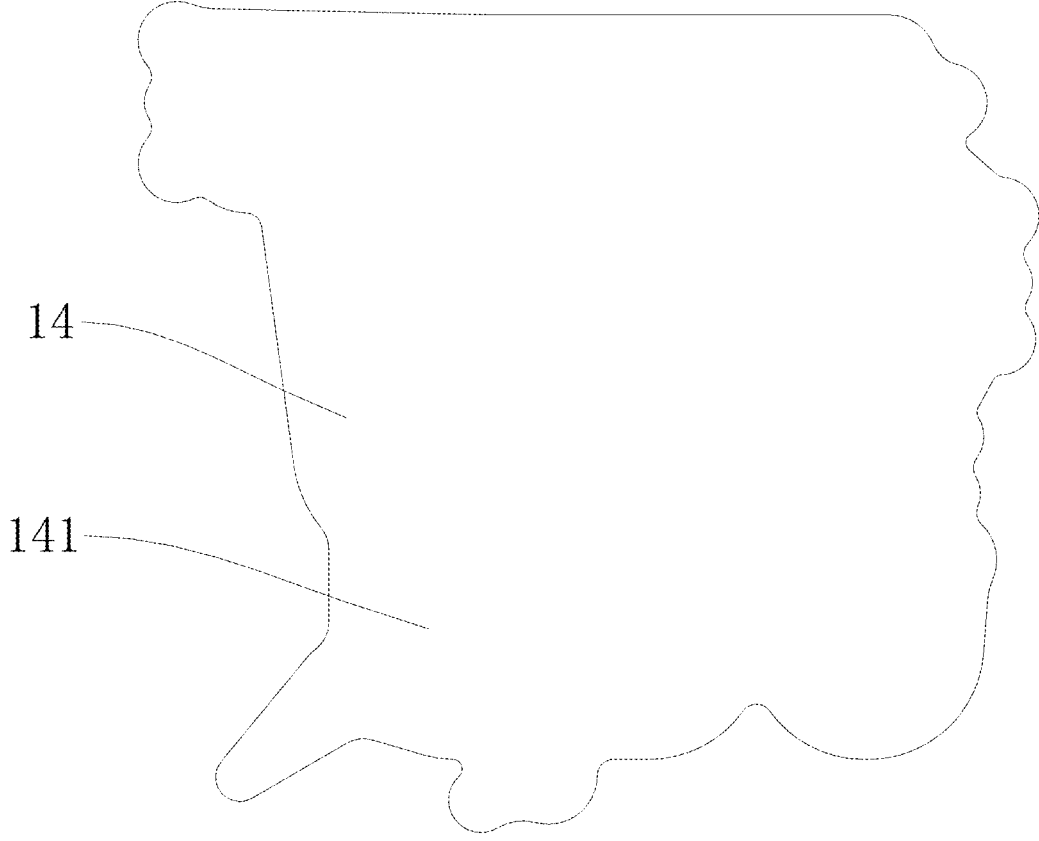
FIG. 15 is a schematic structural view of a first composite plate in FIG. 11 viewed from one perspective.
Figure 16:
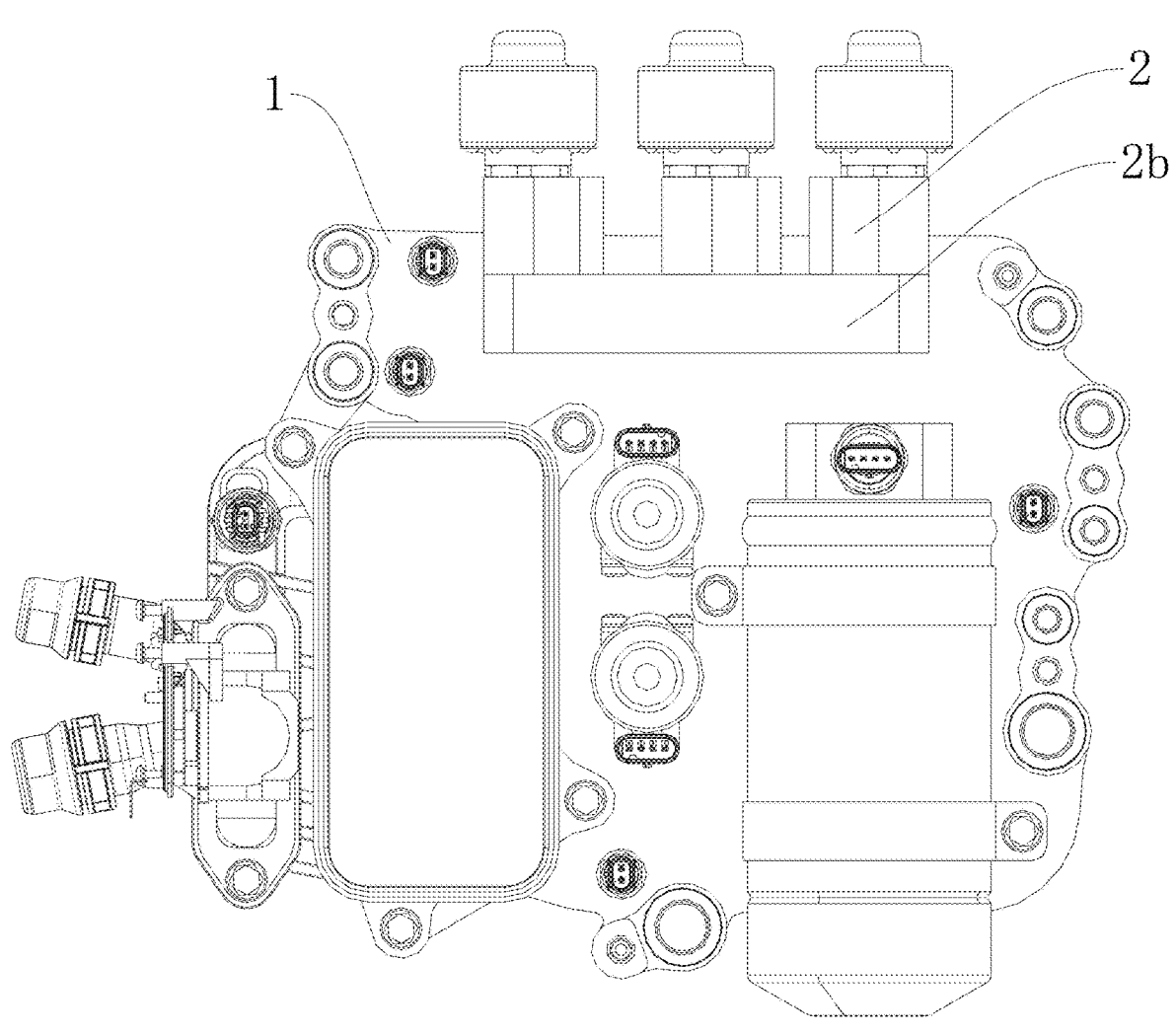
FIG. 16 is a schematic front view of the fluid control assembly in a second embodiment.
Figure 17:
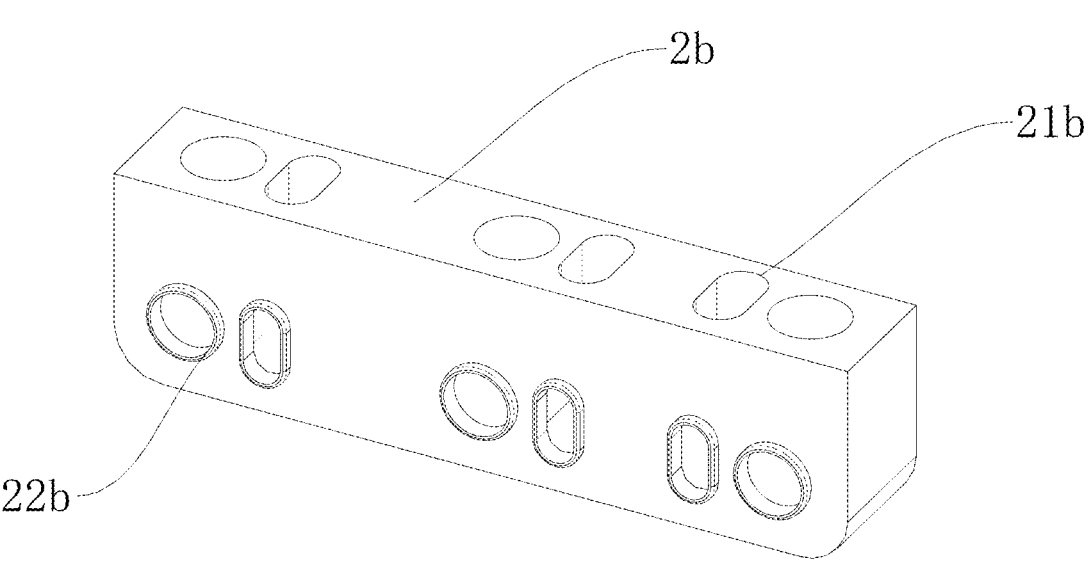
FIG. 17 is a schematic structural view of an intermediate connector in FIG. 16 viewed from one perspective.
Figure 18:
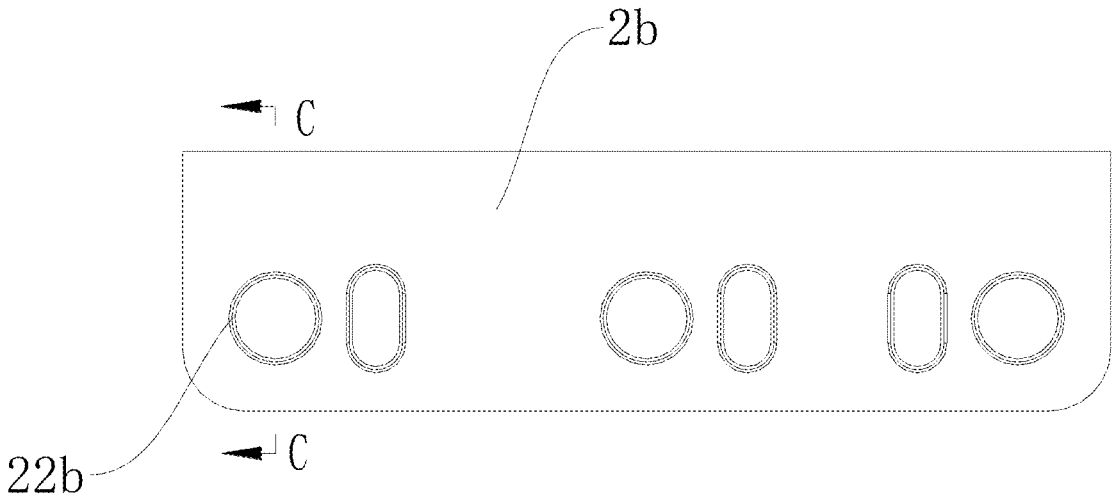
FIG. 18 is a schematic structural view of the intermediate connector in FIG. 16 viewed from another perspective.
Figure 19:
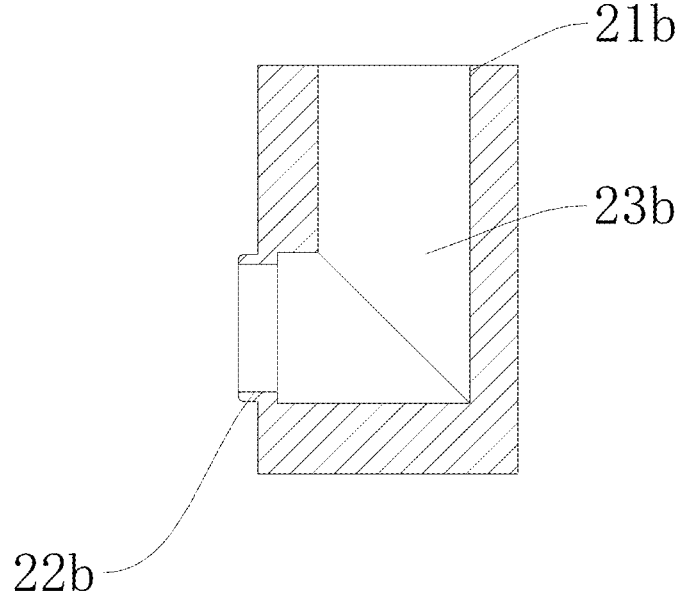
FIG. 19 is a schematic cross-sectional view of the intermediate connector in FIG. 18 taken along line C-C.
Figure 20:
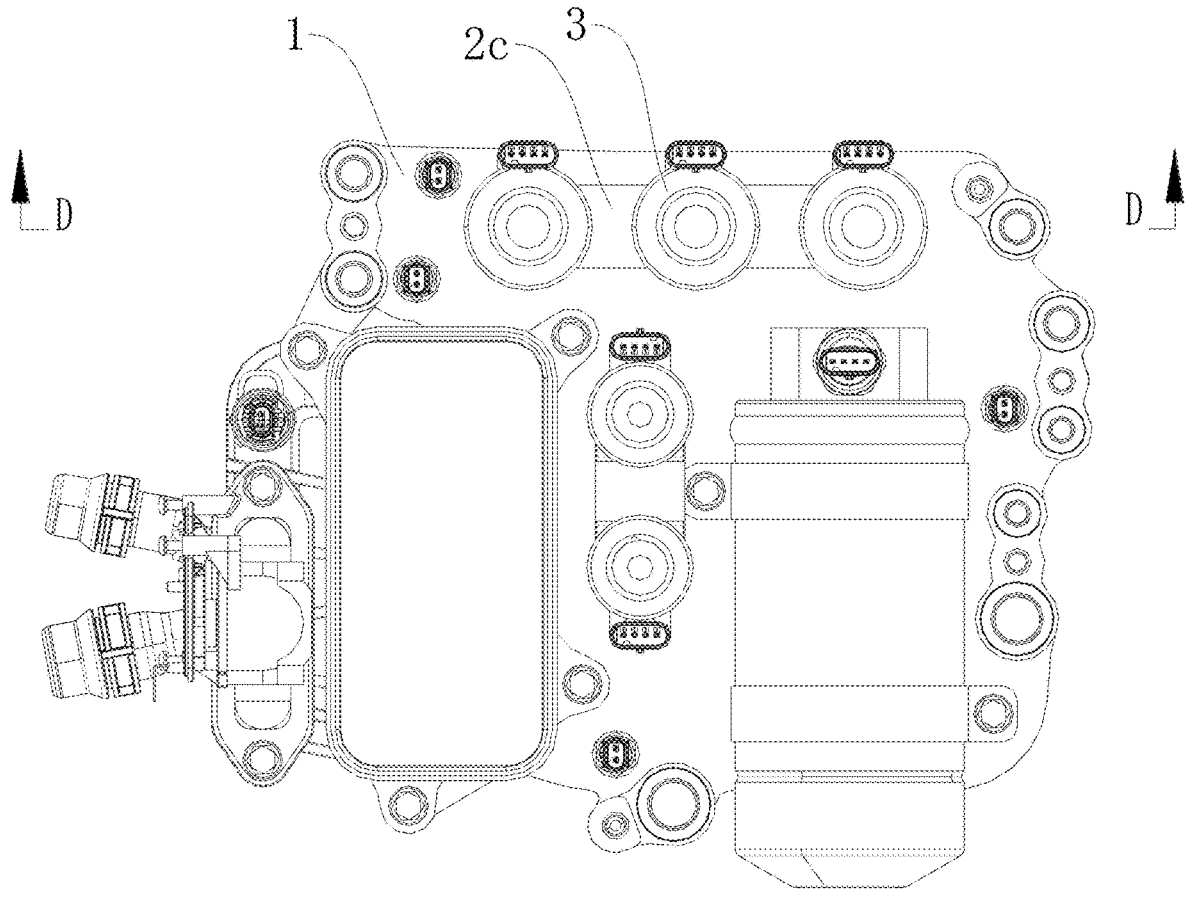
FIG. 20 is a schematic front view of the fluid control assembly in a third embodiment.
Figure 21:
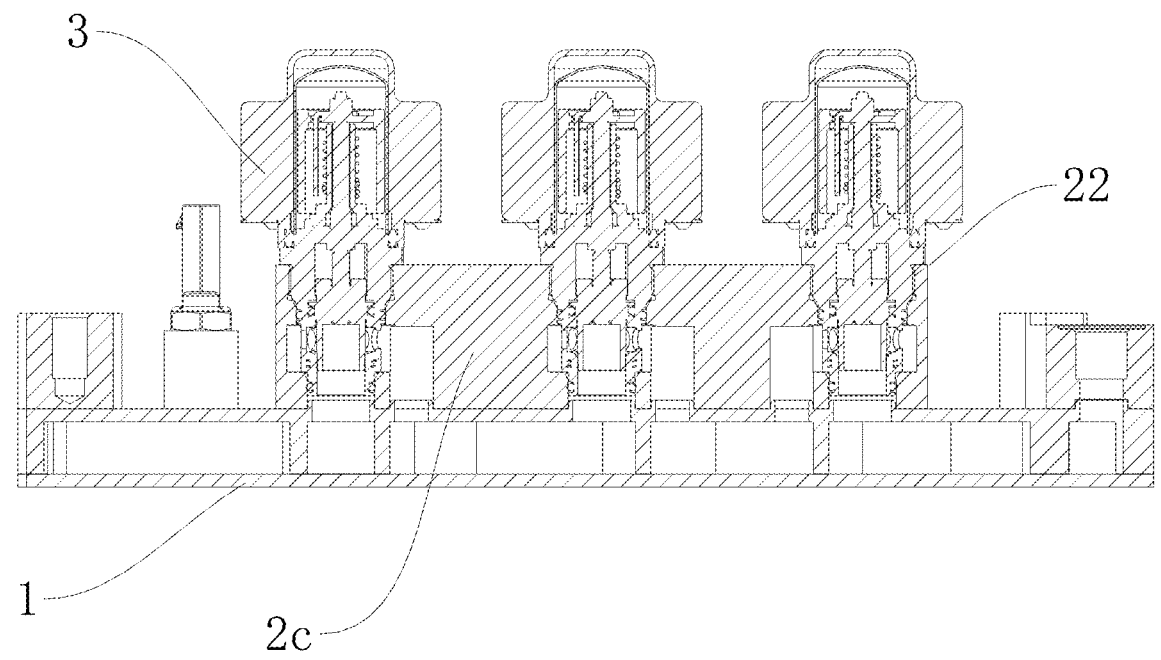
FIG. 21 is a schematic cross-sectional view of the fluid control assembly in FIG. 20 taken along line D-D.
Figure 22:
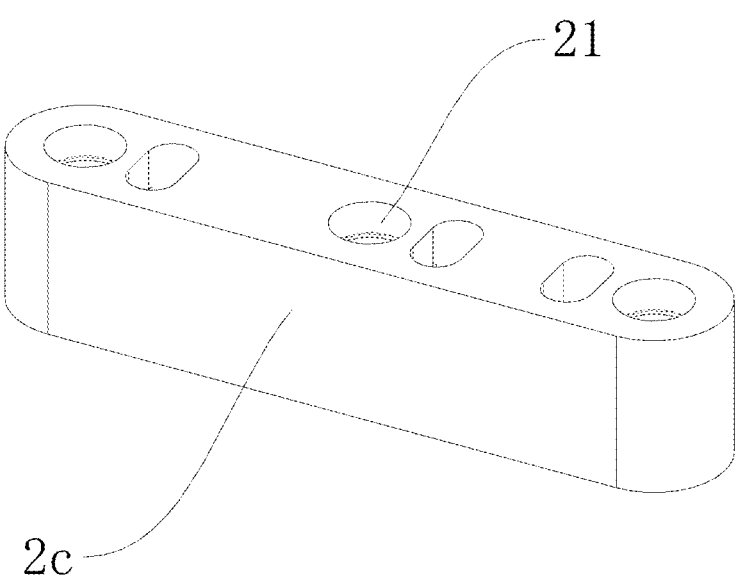
FIG. 22 is a schematic structural view of the connector in FIG. 20 viewed from one perspective.
Figure 23:
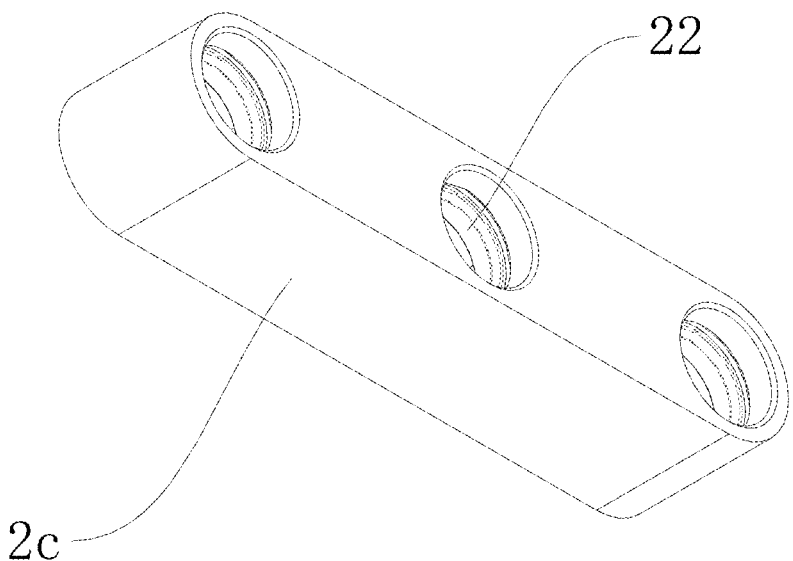
FIG. 23 is a schematic structural view of the connector in FIG. 20 viewed from another perspective.

Referring to FIG. 1, FIG. 9 and FIG. 10, the connector 2 includes a detection element connector 2e, which is fixedly connected with detection elements 4. The detection elements 4 include a temperature detection element and/or a pressure detection element, and the mounting ports 22 are configured to mount the detection elements 4. At least a part of the detection elements 4 are located in the mounting ports 22, the number of the mounting ports 22 is the same as the number of the detection elements 4, and the number of the connection ports 21 is the same as the number of the detection elements 4. Alternatively, one mounting port 22 can be used for two detection elements 4. For example, one mounting port 22 can be used for both a temperature detection element and a pressure detection element, and the detection element 4 can detect the pressure or the temperature of the working medium in the passage 11. In this embodiment, multiple detection elements 4 and multiple detection element connectors 2e are provided, and the detection element connectors 2e can be configured so that the plate 1 and the detection element connectors 2e are separately arranged without providing the mounting ports 22 for mounting the detection elements 4 on the plate 1, which facilitates the manufacturing of the plate 1.

Referring to FIG. 1, FIG. 9 and FIG. 10, the connector 2 includes an external connecting pipe connector 2f. An external connecting pipe (not shown) is fixedly connected with the external connecting pipe connector 2f, and the mounting ports 22 are configured to mount the external connecting pipe, at least a part of the external connecting pipe is located inside the mounting port 22, the external connecting pipe is connected with an external component, the external connecting pipe connector 2f includes one or more mounting ports 22, and the number of the external connecting pipe connectors 2f is one or more. In this embodiment, multiple external connecting pipe connectors 2f are provided, and the external connecting pipe connectors 2f can be configured so that the plate 1 and the external connecting pipe connectors 2f are separately arranged without providing the mounting ports 22 for mounting external connecting pipes on the plate 1, which can facilitate the manufacturing of the plate 1. In addition, different mounting ports 22 may be provided in the external connecting pipe connectors 2f as required so as to be connected with external connecting pipes with different types or specifications. In this way, when different customers have different external connecting pipes and the structure of the mounting port 22 needs to be varied, it only needs to manufacture the external connecting pipe connector 2f with corresponding mounting port 22 while the plate 1 does not need to be re-manufactured.

Figure 27:
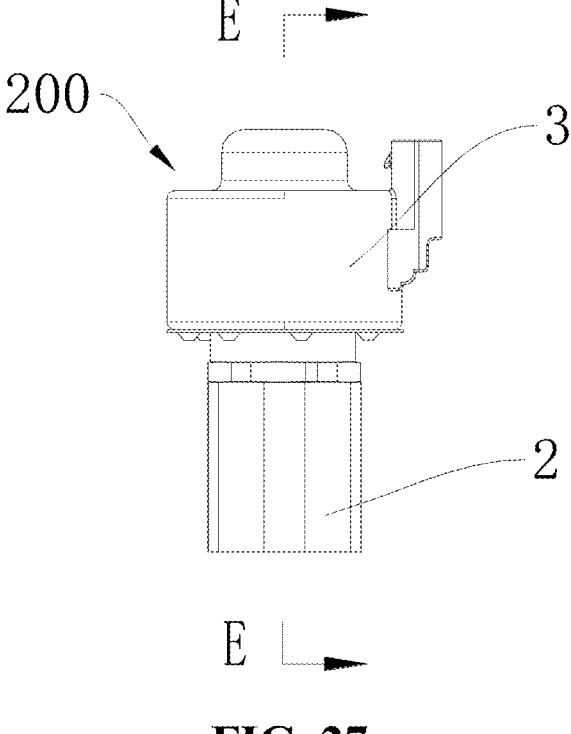
FIG. 27 is a schematic structural view of a valve device in one embodiment.
Figure 28:
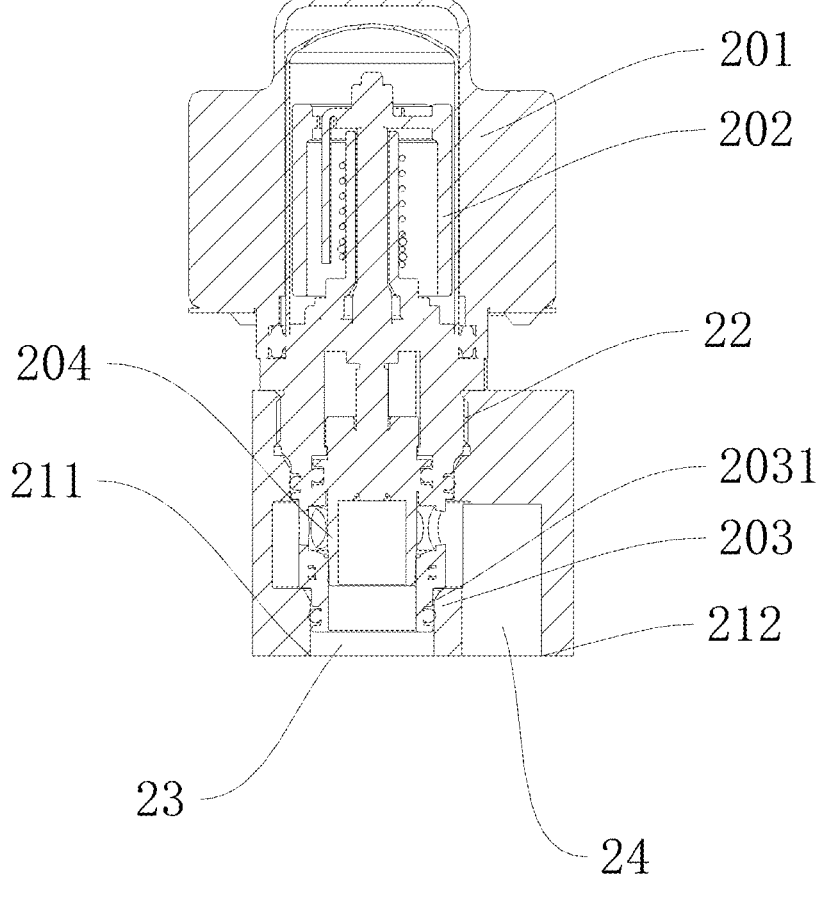
FIG. 28 is a schematic cross-sectional view of the valve device in FIG. 27 taken along line E-E.

Referring to FIG. 27 and FIG. 28, a valve device 200 includes a valve component 3 and a connector 2, the valve component 3 is fixedly connected with the connector 2, the valve component 3 has a mounting port 22, and at least a part of the valve component 3 is located inside the mounting port 22. The connector 2 includes a first connection port 211, a second connection port 212, a first flow passage 23 and a second flow passage 24. The first connection port 211 and the second connection port 212 are located on a same wall of the connector 2, and the first flow passage 23 is perpendicular to the second flow passage 24, which facilitates the manufacturing of the connector 2, reduces the volume of the connector 2, and saves the materials. The valve device 200 includes a coil assembly 201, a rotor assembly 202, a valve seat assembly 203 and a valve core assembly 204. The valve seat assembly has the valve port 2031. An excitation magnetic field is generated by energizing the coil assembly 201, and the rotor assembly 204 is rotatable in the excitation magnetic field. The rotor assembly 202 drives the valve core assembly 204 to move relative to the valve port, and the first flow passage 23 is in communication with the second flow passage 24 through the valve port, so that, in this embodiment, a working medium can be block or in directly communication between the first flow passage 23 and the second flow passage 24. Alternatively, in other embodiments, the rotor assembly 202 drives the valve core assembly 204 to move relative to the valve port, to adjust a flow rate of the working medium between the first flow passage 23 and the second flow passage 24. The valve device and the plate may be fixedly connected by welding and sealed by a welding surface, or the connector is fixed to the plate by welding, and the valve component is fixedly connected with the connector.

It should be noted that the above embodiments are merely used to illustrate the present disclosure and not to limit the technical solutions described in the present disclosure. Although the present disclosure has been described herein in detail with reference to the above embodiments, those of ordinary skill in the art should understand that those skilled in the art may still modify or equivalently replace the present disclosure, and all technical solutions and its improvements that do not apart from the spirit and scope of the present disclosure should be covered by the scope of the claims of the present disclosure.

The invention claimed is:

1. A fluid control assembly, comprising: a plate; and at least one connector, wherein the plate and the connector are separately arranged and fixedly connected, the plate is provided with passages and orifices, the orifices at least comprise a first orifice and a second orifice, the passages at least comprise a first passage and a second passage, the first orifice is in communication with the first passage, the second orifice is in communication with the second passage, and the first orifice and the second orifice are located on a same wall of the plate, the connector is provided with at least two connection ports, the connection ports comprise a first connection port and a second connection port, the first connection port and the second connection port are located on a same wall of the connector, and each of the connection ports is arranged corresponding to at least part of a corresponding one of the orifices, the connector is further provided with a mounting port, and the mounting port is configured to mount a valve component; the plate comprises a first plate portion and a first composite plate, the first plate portion has slot cavities forming part of the passages and holes, the slot cavities are in communication with the holes, each of the orifices is located on an outer side of the hole, the slot cavities and the holes are integrally formed by cold extrusion process, and the first plate portion is in abutment with and connected with the first composite plate;

the fluid control assembly comprises at least two positioning portions, and each of the at least two positioning portions comprises a protrusion; the protrusion is a part of the plate, at least one orifice is formed in the protrusion, and at least a part of the protrusion is located inside the connection port; or, the protrusion is a part of the plate, the positioning portion further comprises a recess, the recess is formed on the connector, an opening of the recess is arranged toward the plate, the recess is arranged around the connection port, and at least a part of the protrusion is located in the recess.

2. A fluid control assembly, comprising: a plate; and at least one connector, wherein the plate and the connector are separately arranged and fixedly connected, the plate is provided with passages and orifices, the orifices at least comprise a first orifice and a second orifice, the passages at least comprise a first passage and a second passage, the first orifice is in communication with the first passage, the second orifice is in communication with the second passage, and the first orifice and the second orifice are located on a same wall of the plate, the connector is provided with at least two connection ports, the connection ports comprise a first connection port and a second connection port, the first connection port and the second connection port are located on a same wall of the connector, and each of the connection ports is arranged corresponding to at least part of a corresponding one of the orifices, the connector is further provided with a mounting port, and the mounting port is configured to mount a valve component; the plate comprises a first plate portion and a first composite plate, the first plate portion has slot cavities forming part of the passages and holes, the slot cavities are in communication with the holes, each of the orifices is located on an outer side of the hole, the slot cavities and the holes are integrally formed by cold extrusion process, and the first plate portion is in abutment with and connected with the first composite plate;

the fluid control assembly comprises one positioning portion, and the positioning portion comprises a protrusion; the protrusion is a part of the plate, at least one orifice is formed in the protrusion, and at least a part of the protrusion is located inside the connection port; or, the protrusion is a part of the plate, the positioning portion further comprises a recess, the recess is formed on the connector, an opening of the recess is arranged toward the plate, the recess is arranged around the connection port, and at least a part of the protrusion is located in the recess;

the plate is further provided with a protruding portion, the connector is provided with a positioning groove or a positioning hole, the protruding portion is located in the positioning groove .

3. The fluid control assembly according to claim 1, wherein the connector and the plate are fixed by welding, a welding layer is provided between the connector and the plate, and the connector and the plate are sealed by the welding layer.

4. The fluid control assembly according to claim 3, wherein the fluid control assembly comprises the valve component, the valve component is fixedly connected with the connector, at least a part of the valve component is located in the mounting port, the connector further comprises a first flow passage and a second flow passage, the first connection port is in communication with the first flow passage, the second connection port is in communication with the second flow passage, both the first connection port and the second connection port are arranged toward the plate, the first connection port is in communication with the first orifice, the second connection port is in communication with the second orifice, the valve component is configured to adjust a flow rate of a working medium between the first flow passage and the second flow passage, or the valve component is configured to block or directly communicate the working medium between the first flow passage and the second flow passage.

5. The fluid control assembly according to claim 4, wherein the fluid control assembly further comprises an intermediate connector, which is fixedly connected with the plate and the connector, the intermediate connector comprises first side connection ports, second side connection ports and an intermediate flow passage, the first side connection ports are in communication with the second side connection ports through the intermediate flow passage, the first side connection ports are in communication with the orifices, the second side connection ports are in communication with the connection ports of the connector, wherein the intermediate connector comprises at least four first side connection ports and at least four second side connection ports, and the intermediate connector is connected with at least two connectors.

6. The fluid control assembly according to claim 4, wherein the connector comprises at least two mounting ports, the connector is fixedly connected with the plate and the valve component, respectively, at least two valve components are mounted on the connector, the valve components are arranged side by side, the mounting ports are located on a side of the connector opposite to the plate, or located on a side of the connector perpendicular to the plate.

7. The fluid control assembly according to claim 6, wherein the connector is T-shaped, the connector is provided with at least three mounting ports, the connector comprises a first portion and a second portion, and the valve components are mounted on the first portion and the second portion, respectively.

8. A fluid control assembly, comprising:

a plate; and at least one connector, wherein the plate and the connector are separately arranged and fixedly connected, the plate is provided with passages and orifices, the orifices at least comprise a first orifice and a second orifice, the passages at least comprise a first passage and a second passage, the first orifice is in communication with the first passage, the second orifice is in communication with the second passage, and the first orifice and the second orifice are located on a same wall of the plate, the connector is provided with at least two connection ports, the connection ports comprise a first connection port and a second connection port, the first connection port and the second connection port are located on a same wall of the connector, and each of the connection ports is arranged corresponding to at least part of a corresponding one of the orifices, the connector is further provided with a mounting port, and the mounting port is configured to mount a valve component; the plate comprises a first plate portion and a first composite plate, the first plate portion has slot cavities forming part of the passages and holes, the slot cavities are in communication with the holes, each of the orifices is located on an outer side of the hole, the slot cavities and the holes are integrally formed by cold extrusion process, and the first plate portion is in abutment with and connected with the first composite plate; the fluid control assembly comprises one positioning portion, and the positioning portion comprises a protrusion; the protrusion is a part of the plate, at least one orifice is formed in the protrusion, and at least a part of the protrusion is located inside the connection port; or, the protrusion is a part of the plate, the positioning portion further comprises a recess, the recess is formed on the connector, an opening of the recess is arranged toward the plate, the recess is arranged around the connection port, and at least a part of the protrusion is located in the recess; the plate is provided with a positioning groove, the connector is provided with a protruding portion, and the protruding portion is located in the positioning groove.

* * * * *